United States Patent [19]

Gabrys

[11] 4,121,740
[45] Oct. 24, 1978

[54] INJECTOR HEAD FOR INJECTION MOLDING MACHINE

[75] Inventor: Kenneth F. Gabrys, Streamwood, Ill.

[73] Assignee: Chicago Rawhide Manufacturing Company, Elgin, Ill.

[21] Appl. No.: 826,034

[22] Filed: Aug. 19, 1977

[51] Int. Cl.² .................... B67D 5/62; B29F 1/03
[52] U.S. Cl. .................. 222/146 H; 222/482; 425/549; 425/565; 425/572
[58] Field of Search ............ 222/330, 478, 146 H, 222/482; 425/547, 549, 565, 570, 572, 574, 581, 588; 239/132.3

[56] References Cited

U.S. PATENT DOCUMENTS

| 3,007,202 | 11/1961 | Wucher | 425/562 X |
|---|---|---|---|
| 3,024,498 | 3/1962 | Bronnenkant et al. | 425/574 X |
| 3,430,939 | 3/1969 | Berry | 239/132.3 |
| 3,482,285 | 12/1969 | Falkenberg | 425/565 X |
| 3,482,285 | 12/1969 | Falkenberg | 425/565 X |
| 3,797,984 | 3/1974 | Yago et al. | 425/549 X |
| 3,923,209 | 12/1975 | Roy | 425/570 X |
| 3,977,820 | 8/1976 | Beyerlein et al. | 425/572 |

FOREIGN PATENT DOCUMENTS 1,590,610   5/1970   France ............... 425/574

Primary Examiner—Francis S. Husar
Assistant Examiner—William R. Briggs
Attorney, Agent, or Firm—Leydig, Voit, Osann, Mayer & Holt, Ltd.

[57] ABSTRACT

A distributing head is attached to the lower end of the barrel of a reciprocating screw injector and carries three injection nozzles which inject molding material into three mold cavities during each injection cycle. The nozzles are supported within sleeves which are surrounded by tubular jackets adapted to receive a heat exchange liquid, the liquid being circulated successively through successive ones of the jackets.

4 Claims, 6 Drawing Figures

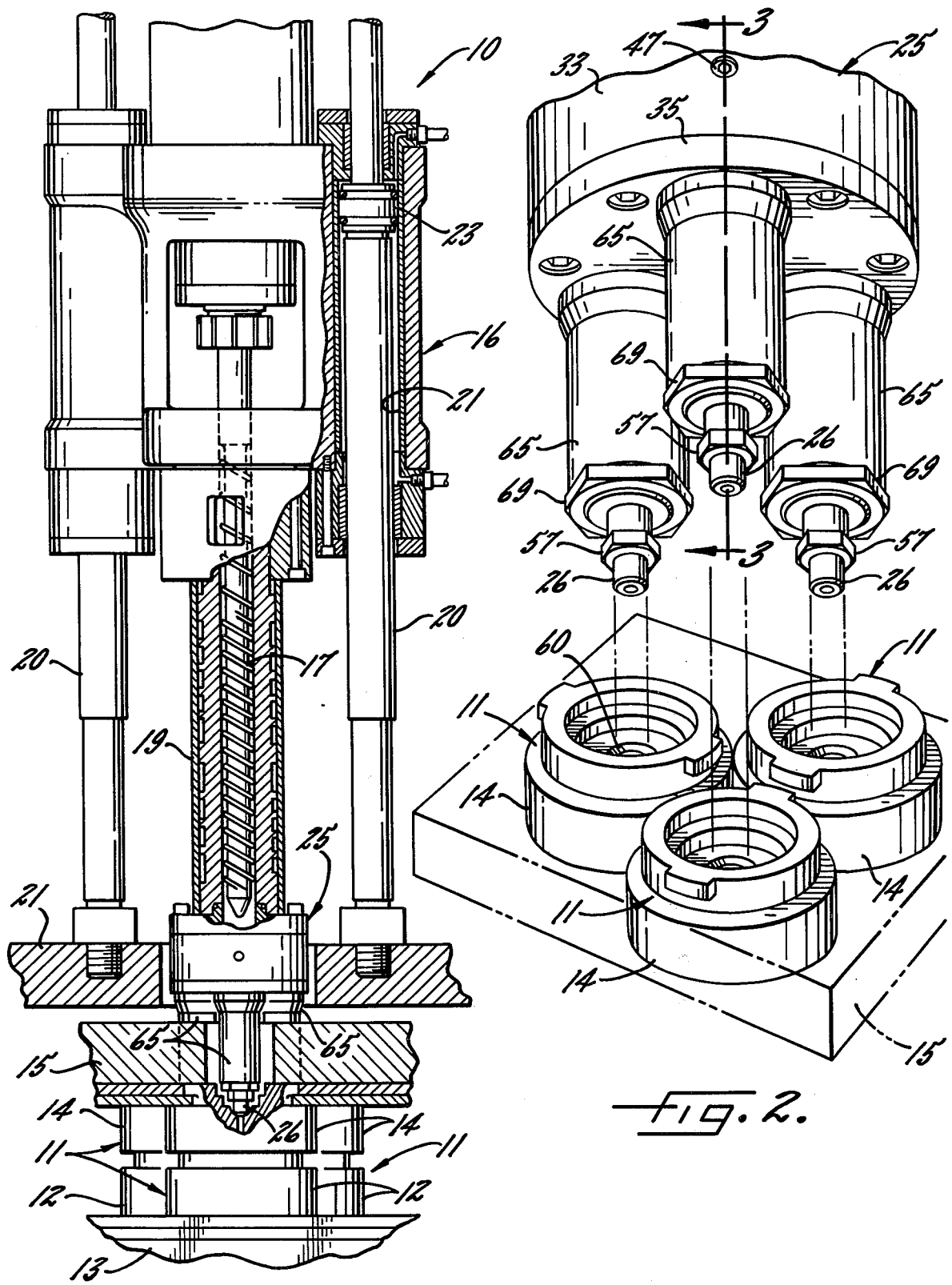

INJECTOR HEAD FOR INJECTION MOLDING MACHINE

BACKGROUND OF THE INVENTION

This invention relates to an injection molding machine and, more particularly, to a molding machine of the type in which a shot of molding material is injected simultaneously into a plurality of mold cavities so as to enable a plurality of molded articles to be formed during a single injection cycle. Conventionally, molding material from an injector is injected into the sprue of a multi-cavity mold and is delivered to the various cavities by means of runners in the mold.

SUMMARY OF THE INVENTION

The general aim of the present invention is to provide a new and improved injection molding machine which is capable of injecting molding material into multiple molds with a full uniform flow and without the need of runners so as to eliminate runner waste.

A more detailed object is to achieve the foregoing by providing an injection molding machine having a novel distributing head which is uniquely equipped with multiple injection nozzles, the nozzles injecting molding material into multiple molds when a charge of molding material is shot into the distributing head.

Still another object of the invention is to provide a molding machine in which the nozzles are carried slidably in sleeves which are surrounded by jackets adapted to successively receive a heat exchange fluid for either heating or cooling the molding material as the material passes into the nozzles.

The invention also resides in the novel and relatively simple construction of the distributing head to enable the molding material to be distributed to the various nozzles and to enable the heat exchange fluid to circulate successively through the jackets without any intermixing of the molding material and the heat exchange fluid.

These and other objects and advantages of the invention will become more apparent from the following detailed description when taken in conjunction with the accompanying drawings.

BRIEF DESCRIPTION OF THE DRAWINGS

FIG. 1 is a fragmentary front elevational view of a new and improved injection molding machine incorporating the unique features of the present invention, certain parts of the machine being broken away and shown in section.

FIG. 2 is an enlarged perspective view of certain parts of the machine shown in FIG. 1.

DETAILED DESCRIPTION OF THE PREFERRED EMBODIMENT

Figure 3:
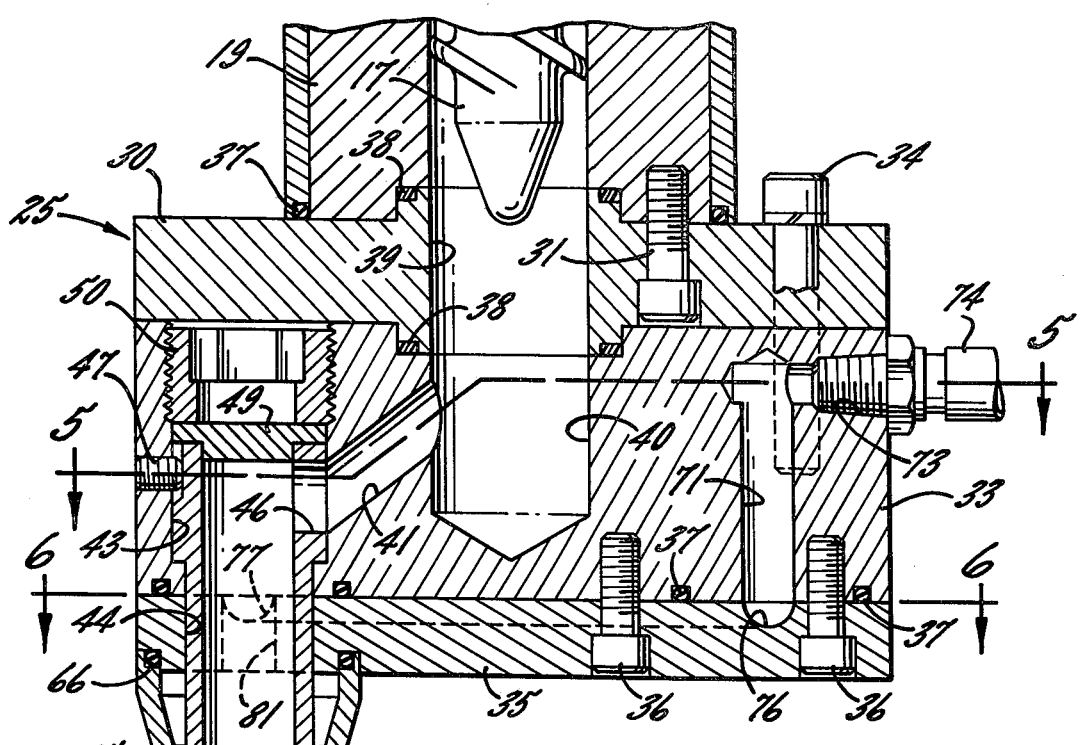
FIG. 3 is an enlarged fragmentary cross-section taken substantially along the line 3—3 of FIG. 2.

As shown in the drawings for purposes of illustration, the invention is incorporated in a machine 10 for injecting molding material such as rubber into a plurality of mold sets 11, there being three identical mold sets shown in the present instance. Each mold set comprises a lower mold 12 supported on a bolster 13 and further comprises an upper mold 14 which is carried by a plate 15. Each upper mold is adapted to be opened and closed with respect to the underlying lower mold and, when the molds are closed, they form a cavity which is adapted to receive the molding material and which defines the size and shape of the article to be molded.

The machine 10 further includes an injector 16 having a screw 17 which is adapted to be rotated and reciprocated within a barrel 19 in a conventional manner so as to discharge a pressurized shot of molding material out of the lower end of the barrel and into the mold sets 11. The injector 16 is guided for up and down sliding on a pair of rods 20 upstanding from a fixed frame 21 and is moved to a lowered position relative to the frame each time a shot of molding material is injected into the mold sets, the injector then being retracted upwardly to a raised position. For this purpose, the rods extend through cylinders 21 formed in the injector and are equipped with pistons 23 which are located within the cylinders. The injector 16 is lowered when pressure fluid is admitted into the lower ends of the cylinders and is raised when pressure fluid is admitted into the upper ends of the cylinders.

In accordance with the primary aspect of the present invention, a unique distributing head 25 is carried on the lower end of the barrel 19 and is provided with multiple nozzles 26—there herein being three nozzles—which simultaneously inject the molding material into the three mold sets 11 when the distributing head is charged with a shot of molding material. With each of the molding sets being served individually by its own injection nozzle 26, multiple cavity molding is accomplished without need of providing runners within the molds to connect the cavities thereof and without loss of molding material which otherwise would be wasted in such runners. Moreover, the use of individual nozzles for the multiple molding sets enables the molding material to be injected into each molding set with more uniform flow and at higher pressure than has been possible heretofore so as to improve the quality of the molded article.

More specifically, the distributing head 25 comprises an upper adaptor plate 30 (FIG. 3) which is secured to the lower end of the barrel 19 by screws 31, a central block 33 which is secured to the lower side of the adaptor plate by screws 34, and a lower plate 35 which is secured to the lower side of the block by screws 36. O-rings 37 are positioned at various locations between the members 19, 30, 33 and 35 to establish liquid-tight seals therebetween. Glass-filled TEFLON rings 38 are located between the adaptor plate 30 and the barrel 19 and between the adaptor plate and the block 33 to establish high pressure seals.

Figure 5:
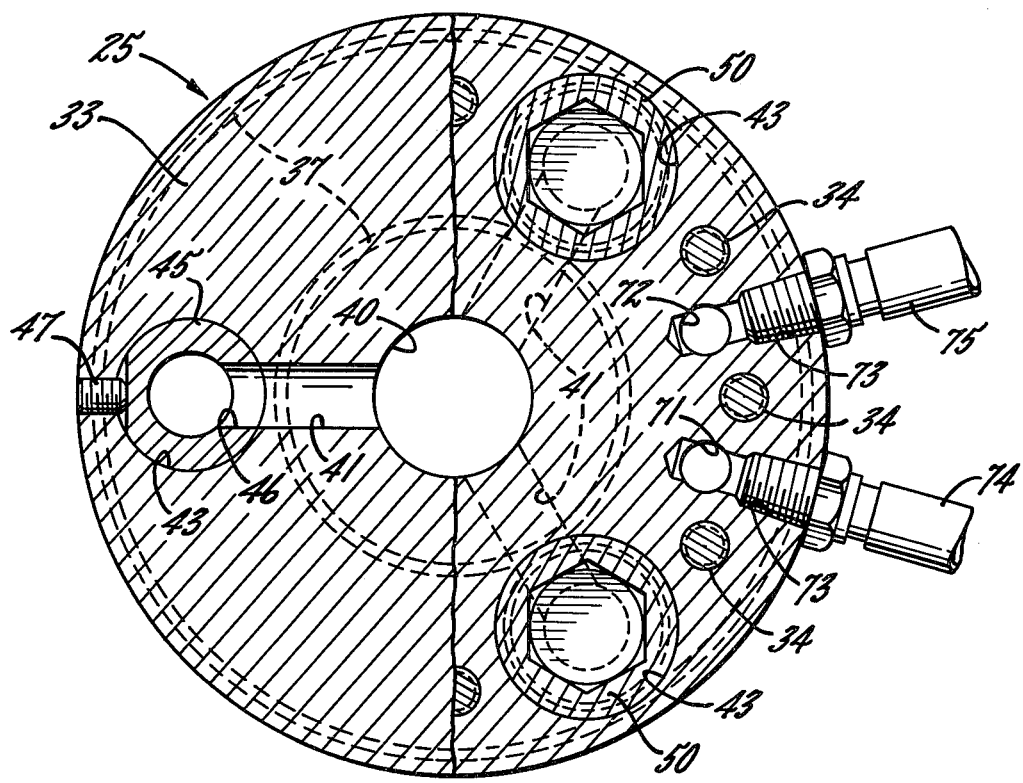
FIG. 5 and 6 are cross-sections taken substantially along the lines 5—5 and 6—6, respectively, of FIG. 3.

As shown in FIG. 3, a central passage 39 extends downwardly through the adaptor plate 30 and establishes communication between the barrel 19 and a central passage 40 which is formed in the block 33. Molding material which is delivered from the barrel and into the central passage 40 is supplied to the three injector nozzles 26 by way of three angularly spaced and downwardly inclined passages 41 (FIGS. 3 and 5) formed in the block and having inner ends communicating with the central passage. The outer ends of the passages 41 communicate with three angularly spaced and vertically extending openings 43 (FIGS. 3 and 5) formed through the block 33, these openings being alined vertically with three vertically extending openings 44

Figure 6:
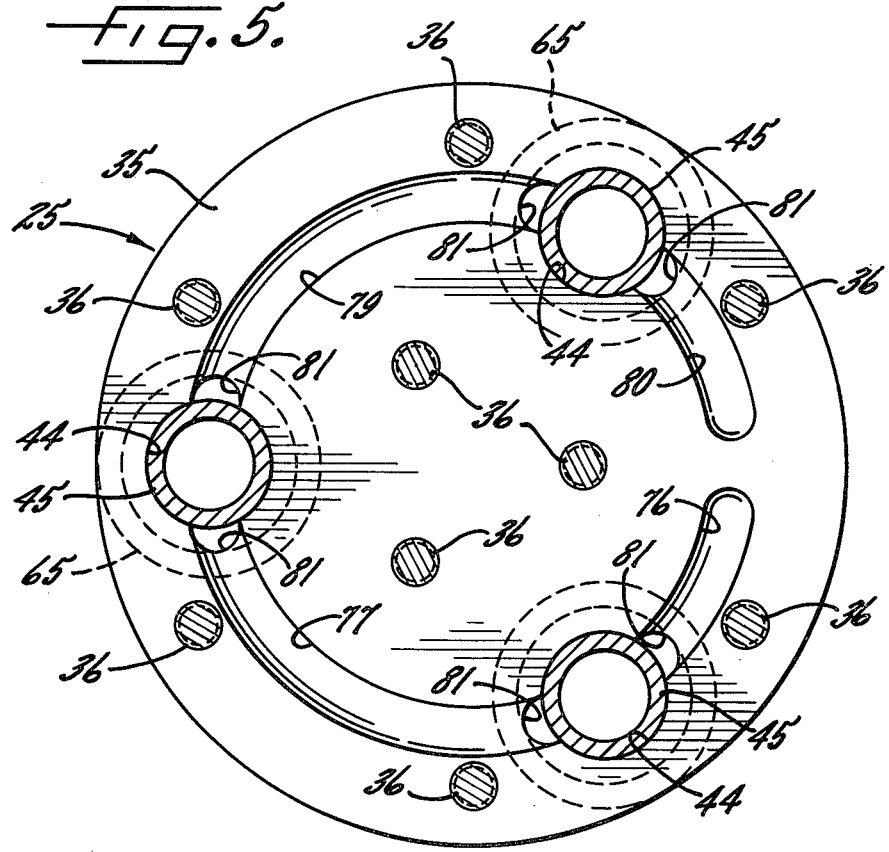

(FIGS. 3 and 6) which are formed through the bottom plate 35.

Each injector nozzle 26 is supported in the lower end portion of a sleeve 45 (FIG. 3) located with a close fit within one of the pairs of openings 43 and 44 and projecting downwardly from the bottom plate 35. A radially extending port 46 is formed in the upper end portion of each sleeve and communicates with the outer end of one of the passages 41 to enable molding material to flow into the sleeve. To keep the port 46 in angular alinement with the passage 41, a set screw 47 is threaded into the block and engages the sleeve 45 to prevent the latter from rotating. The upper end of each sleeve is closed by a cap 49 which is held in place by a threaded plug 50 in the upper end of the opening 43.

Figure 4:
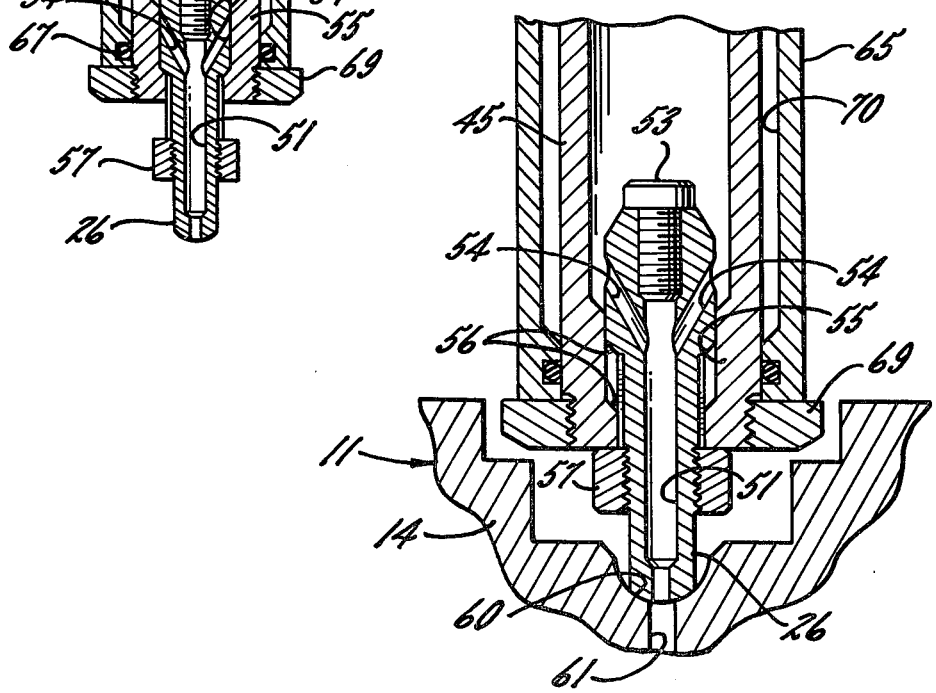
FIG. 4 is an enlarged fragmentary view of parts illustrated in FIG. 3 with the injector nozzle being shown in a moved position.

As shown in FIG. 4, each injection nozzle 26 is formed with a centrally located and downwardly opening passage 51 whose upper end is closed by a screw 53. Angularly spaced and downwardly inclined passages 54 are formed in each nozzle to enable the molding material to flow from the sleeve 45 to the central passage 51 of the nozzle.

Advantageously, each nozzle 26 is supported within its sleeve 45 to slide between raised and lowered positions relative to the sleeve in order to control the flow of molding materail from the nozzle. When the nozzle is in its raised position as shown in FIG. 4, the passages 54 communicate with the interior of the sleeve to enable molding material to flow into the central passage 51 and out of the lower end of the nozzle. When the nozzle is in its lowered position (see FIG. 3), the passages are closed by a reduced diameter section 55 of the sleeve and thus flow into the nozzle is blocked. Downward sliding of each nozzle is limited by coacting shoulders 56 (FIG. 4) formed on the nozzle and within the sleeve 45 while upward sliding of the nozzle is limited by a nut 57 on the lower end portion of the nozzle engaging the lower end of the sleeve.

Prior to the start of each molding cycle, each nozzle 26 is located in its lowered position within its respective sleeve 45 while the injector 16 is located in its raised position relative to the molding sets 11. With the nozzles and the injector thus positioned, the lower tips of the nozzles are spaced upwardly from the upper molds 14 and there is no flow of molding material through the nozzles.

A molding cycle is initiated by shifting the injector 16 downwardly toward the mold sets 11 by shifting the screw 17 downwardly within the barrel 19. The screw thus forces molding material under high pressure into the sleeves 45 by way of the centrally locate passages 39 and 40 and the angularly spaced passages 41.

As the injector 16 moves downwardly, the tips of the three nozzles 26 engage and seat in the bottoms of cavities 60 (see FIG. 4) formed in the upper sides of the upper molds 14, the central passage 51 of each nozzle being alined with a sprue 61 formed in the upper side of each upper mold. With continued downward movement of the injector, the sleeves 45 shift donwardly with respect to the stopped nozzles 26 (see FIG. 4) and the latter assume their raised positions relative nozzles is sleeves so that molding material may flow from the sleeves into the central passages 51 of the nozzles by way of the passages 54 and may flow from the central passages and into the sprues 61 of the molding sets 11. The molding material flows into each molding set in a uniform umbrella-shaped pattern to insure uniform filling of the cavity.

After sufficient time has elapsed to fill the cavities of the molding sets 11, the injector 16 is raised upwardly and the screw 17 is turned to re-charge the sleeves 45 with molding material. The pressure of the molding material in the sleeves acts against the upper ends of the nozzles 26 to force the latter toward their lowered positions relative to the sleeve (see FIG. 3) and block off the flow of molding material through the passages 54. Accordingly, the flow of molding material from the nozzlsie stopped automatically as an incident to retraction of the injector.

From the foregoing, it will be apparent that the present invention brings to the art a new and improved injection molding machine 10 having a distributing head 25 which is uniquely equipped with multiple injector nozzles 26 to enable molding material to be injected simultaneously into a multiplicity of mold cavities without the need of runners or the like. Thus, more uniform flow is achieved and, at the same time, the amount of molding material which is wasted is reduced.

The present invention also contemplates constructing the distributing head 25 in a novel manner to enable a heat exchange fluid to be circulated successively around the three sleeves 45. Normally, the heat exchange fluid will be hot water which serves to keep the molding material in the sleeves at a high temperature. Under certain conditions, however, cooling water may be circulated around the sleeves.

Herein, the water is circulated around each sleeve 45 in a jacket 65 which surrounds the sleeve. Each jacket is in the form of a tubular member whose upper end is sealed to the lower side of the bottom plate 35 by an O-ring 66 (FIG. 3) and whose lower end is sealed to the outer side of the lower end portion of the sleeve by an O-ring 67. A nut 69 is threaded onto the lower end portion of the sleeve and engages the lower end of the jacket 65 to hold the upper end of the jacket against the lower side of the bottom plate 35.

Each jacket 65 surrounds its respective sleeve 45 with radial clearance and thus an annular chamber 70 (FIG. 3) is defined between the jacket and the sleeve. Water is circulated successively through the three chambers by means of a unique passage system which is formed in the distributing head 25. The passage system serves to keep the water from intermixing with the molding material and may be incorporated in the head in a comparatively simple and inexpensive manner.

In the present instance, the passage system includes angularly spaced inlet and outlet passages 71 and 72 (FIGS. 3 and 5) whick are disposed in side-by-side relation. The inlet and outlet passages are defined by vertical holes which are drilled upwardly from the lower side of the block 33 of the distributing head 35. Radially extending ports 73 lead into the inlet and outlet passages from the outer side of the block and serve to connect the inlet and outlet passages with inlet and outlet hoses 74 and 75, respectively. Water is admitted into the head through the inlet hose and is exhausted from the head by way of the outlet hose.

The lower end of the inlet passage 71 overlies one end of an arcuate groove 76 (FIG. 6) which is formed in the upper side of the bottom plate 35 of the head 25. That groove extends to a first one of the openings 44 in the bottom plate while another arcuate groove 77 extends between the first opening and a second one of the openings 44. A similar groove 79 extends between the second opening and the third opening 44 and yet another groove 80 leads from the third opening to a point just below the outlet passage 72. Semi-circular holes 81 are formed vertically through the bottom plate 35 at each end of each of the grooves 77 and 79 and at one end of each of the grooves 76 and 80. The holes 81 establish communication between the grooves and the jackets 65 even though the sleeves 45 are received in the openings 44 with a close fit.

With the foregoing arrangement, water is admitted into the inlet passage 71 from the inlet hose 74 and flows downwardly into the groove 76. The water flows around the groove 76 to the hole 81 at the end of the groove and then flows downwardly through the hole, along the outer side of the sleeve 45 adjacent the hole, and into the jacket 65 located below the first opening 44. The water circulates through the jacket and returns upwardly through the hole 81 at the upstream end of the groove 77. Thereafter, the water flows around the groove 77, into and out of the jacket 65 located at the downstream end of the groove 77, and around the groove 79. After flowing into the jacket 65 located at the downstream end of the groove 79, the water flows upwardly out of the hole 81 at the upstream end of the groove 80 and flows around that groove to the outlet passage 72 and the outlet hose 75. Thus, the water circulates through successive ones of the jackets 65 and along a flow path which avoids any danger of the water intermixing with the molding material.

I claim:

1. A machine for injecting molding material simultaneously into the upper ends of a plurality of molds, said machine comprising a head, mechanism connected to said head for moving the latter between raised and lowered positions relative to such molds, a plurality of sleeves depending from and spaced angularly around said head and corresponding in number to the number of such molds, a substantially centrally located passage leading into said head and adapted to receive a shot of pressurized molding material, a plurality of angularly spaced passages extending between said centrally located passage and said sleeves to deliver said molding material from said centrally located passage to said sleeves, a nozzle telescoped slidably within the lower end portion of each of said sleeves, each of said nozzles being positioned to engage a mold and being adapted to be forced to a raised position within the respective sleeve when said head is moved to its lowered position, each of said nozzles moving to a lowered position within the respective sleeve when said head is moved to its raised position, a passage in each nozzle and establishing communication between the interior of the nozzle and the interior of the respective sleeve when said nozzle is moved to its raised position whereby the molding material in the sleeve flows through the nozzle means in the lower end portion of each sleeve for blocking communication between the interior of the sleeve and the interior of the respective nozzle when the nozzle is in its lowered position within the sleeve, said head comprising a block and further comprising a lower plate secured to the lower side of said block, said lower plate having openings which receive said sleeves, upright inlet and outlet passages formed in said block and disposed in side-by-side relation, said inlet and outlet passages opening out of the lower side of said block, a first groove formed in the upper side of said lower plate and establishing communication between said inlet passage and a first one of said openings, a second groove formed in the upper side of said lower plate and establishing communication between said outlet passage and a second one of said openings, groove means in the upper side of said lower plate and establishing communication between said first and second openings, a tubular jacket surrounding each sleeve and spaced radially from said sleeve, each of said jackets communicating at its upper end with the opening which receives the respective sleeve, and means connected to said inlet passage for delivering a heat exchange fluid into said inlet passage whereby said fluid flows through said first groove to said first opening, circulates through the jacket which communicates with said first opening, flows through said groove means to said second opening, circulates through the jacket which communicates with said second opening, and then flows through said second groove to said outlet passage.

2. A machine as defined in claim 1 in which one of said openings constitutes a third opening located between said first and second openings, said groove means comprising a third groove leading from said first opening to said third opening and further comprising a fourth groove leading from said third opening to said second opening.

3. A machine as defined in claim 2 in which each of said sleeves is received in its respective opening with a close fit, and upright holes formed through said lower plate and establishing communication between said grooves and said openings, there being one hole located at each end of said third and fourth grooves, there being one hole located at the downstream end of said first groove and there being one hole located at the upstream end of said second groove.

4. A machine as defined in claim 1 in which said centrally located passage and said angularly spaced passages are formed in said block.

* * * * *